United States Patent
Yamamoto et al.

(10) Patent No.: US 10,560,004 B2
(45) Date of Patent: Feb. 11, 2020

(54) SENSOR MAGNET HOLDER, MAGNET FIXING STRUCTURE, AND MOTOR

(71) Applicant: Mabuchi Motor Co., Ltd., Matsudo, Chiba (JP)

(72) Inventors: Kazuyuki Yamamoto, Matsudo (JP); Satoshi Kikuchi, Matsudo (JP)

(73) Assignee: MABUCHI MOTOR CO., LTD., Matsudo, Chiba (JP)

( * ) Notice: Subject to any disclaimer, the term of this patent is extended or adjusted under 35 U.S.C. 154(b) by 253 days.

(21) Appl. No.: 15/678,715

(22) Filed: Aug. 16, 2017

(65) Prior Publication Data

US 2017/0346372 A1    Nov. 30, 2017

Related U.S. Application Data

(63) Continuation of application No. PCT/JP2016/052134, filed on Jan. 26, 2016.

(30) Foreign Application Priority Data

Feb. 20, 2015    (JP) .................................. 2015-031974

(51) Int. Cl.
    *H02K 11/215*    (2016.01)
(52) U.S. Cl.
    CPC .................... *H02K 11/215* (2016.01)
(58) Field of Classification Search
    CPC ........ H02K 1/28; H02K 29/08; H02K 11/215; H02K 7/1166
    USPC ........ 310/68 B, 75 R, 83; 324/207.2, 207.25
    See application file for complete search history.

(56) References Cited

U.S. PATENT DOCUMENTS

| | | | | |
|---|---|---|---|---|
| 5,565,721 | A * | 10/1996 | Knappe ................... | G01P 3/487 310/156.22 |
| 6,013,961 | A * | 1/2000 | Sakamaki .............. | H02K 23/66 310/177 |
| 7,973,529 | B2 * | 7/2011 | Kikuchi ................. | H02K 23/66 324/173 |

FOREIGN PATENT DOCUMENTS

| | | |
|---|---|---|
| CN | 102801251 A | 11/2012 |
| JP | 2006-180580 | 7/2006 |
| JP | 2006-180580 A | 7/2006 |
| JP | 2010-035411 A | 2/2010 |
| JP | 2012-016235 | 1/2012 |
| JP | 2012-016235 A | 1/2012 |
| JP | 2012-244851 A | 12/2012 |
| JP | 2014-200128 A | 10/2014 |

OTHER PUBLICATIONS

Notification of Reasons for Refusal for Japanese Application No. 2015-031974 dated Jun. 20, 2018; 7 pages including English translation.

(Continued)

*Primary Examiner* — Burton S Mullins
(74) *Attorney, Agent, or Firm* — Schwabe Williamson & Wyatt, PC

(57) ABSTRACT

A sensor magnet holder is used to fix a sensor magnet to a motor shaft. The sensor magnet holder includes a press fitting part to which the motor shaft is press fitted; a holding part provided radially outside the press fitting part to hold the sensor magnet; and a joint part that joins the press fitting part and the holding part. The joint part is configured such that at least a part of the joint part is deflected by an external force.

10 Claims, 18 Drawing Sheets

(56) References Cited

OTHER PUBLICATIONS

First Notice of Reason for Refusal for Chinese Application No. 2016800104205 dated Dec. 12, 2018; 11 pages including English translation.
Patent Cooperation Treaty: International Preliminary Report on Patentability for PCT/JP2016/052134 dated Apr. 19, 2016; 12 pages including English translation.
Patent Cooperation Treaty: International Search Report for PCT/JP2016/052134 dated Apr. 19, 2016; 5 pages including English translation.
The State Intellectual Property Office of People's Republic of China—Second Office Action in CN App. No. 201680010420.5 dated Jul. 16, 2019; 15 pages including English translation.
Notice of Refusal for Japanese Application No. 2015-031974 dated Nov. 30, 2017; 6 pages including English translation.

* cited by examiner

32

32

74

80

SENSOR MAGNET HOLDER, MAGNET FIXING STRUCTURE, AND MOTOR

This application is based upon and claims the benefit of priority from the prior Japanese Patent Application No. 2015-031974, filed on Feb. 20, 2015, and International Patent Application No. PCT/JP2016/052134, filed on Jan. 26, 2016, the entire content of each of which is incorporated herein by reference.

BACKGROUND OF THE INVENTION

1. Field of the Invention

The present invention relates to a holder used for a sensor magnet.

2. Description of the Related Art

In the related art, rotation detectors for detecting a rotational speed and rotational position are used in small motors. In a rotation detector, magnets called sensor magnets in which magnetic poles are alternately formed in the circumferential direction are fixed to the motor shaft and a magnetically sensitive device is provided in the neighborhood of the magnets. The sensor magnet is magnetized such that the magnetic flux varies in accordance with the rotation of the rotor. Variation in the magnetic pole position of the sensor magnet detected by the magnetically sensitive device and accompanying the rotation of the motor shaft corresponds to variation in the rotational position of the rotor.

It is therefore necessary to fix the sensor magnet to the motor shaft. One approach to fix the sensor magnet to the motor shaft is to press fitting the motor shaft to the center of the sensor magnet directly. However, this method may crack the sensor magnet. An alternative method of fixing the sensor magnet to the motor shaft is proposed whereby the sensor magnet is fixed to the motor shaft via a sensor magnet holder (see JP2010-35411).

The sensor magnet holder according to this method includes a cylindrical part formed with a press fitting part to which the motor shaft is press fitted and a plurality of plate-shaped snap fits projecting from the cylindrical part in an axial direction, where the cylindrical part and the snap fits are formed as one piece. The sensor magnet is fixed to the magnet holder by the plurality of snap fits that are elastically deformed. For this reason, the stress from the motor shaft generated when the motor shaft is press fitted to the sensor magnet holder is not directly transmitted to the sensor magnet so that the likelihood of occurrence of a crack in the sensor magnet is reduced.

However, since the snap fits of the aforementioned sensor magnet holder are formed to project axially from the cylindrical part formed with the press fitting part, the axial length of the sensor magnet holder is relatively long. This increases the length of the motor shaft necessary to attach the sensor magnet holder. Accordingly, further improvements are necessary in order to reduce the size of the motor, and, in particular, the length of the motor shaft.

SUMMARY OF THE INVENTION

The present invention addresses the aforementioned issue, and a purpose thereof is to provide a technology of reducing the size of a sensor magnet holder for fixing a sensor magnet to a shaft.

A sensor magnet holder according to an embodiment of the present invention is used to fix a sensor magnet to a motor shaft and includes: a press fitting part to which the motor shaft is press fitted; a holding part provided radially outside the press fitting part to hold the sensor magnet; and a joint part that joins the press fitting part and the holding part. The joint part is configured such that at least a part of the joint part is deflected by an external force.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
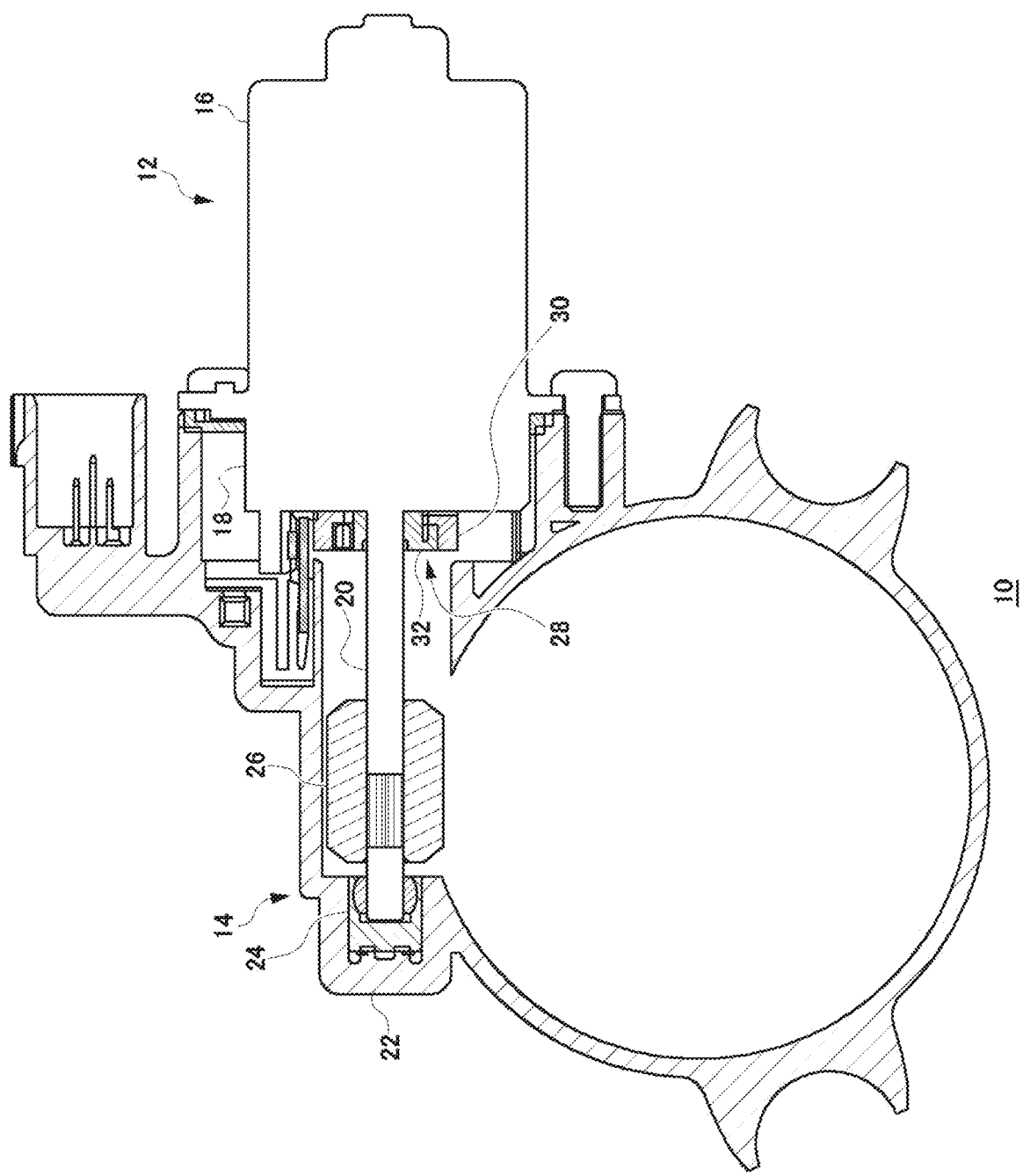
FIG. 1 is a sectional view of a motor with a worm reducer according to the embodiment provided with a rotation detector.

A sensor magnet holder according to an embodiment of the present invention is used to fix a sensor magnet to a motor shaft and includes: a press fitting part to which the motor shaft is press fitted; a holding part provided radially outside the press fitting part to hold the sensor magnet; and a joint part that joins the press fitting part and the holding part. The joint part is configured such that at least a part of the joint part is deflected by an external force.

According to this embodiment, the sensor magnet holder can be thinner than otherwise because the press fitting part and the holding part are not aligned in the axial direction of the motor shaft. Further, the holding part is capable of holding the sensor magnet in a stable manner as a result of the joint part being deflected. By designing the joint part as appropriate, the holding part is prevented from biasing the sensor magnet with an unnecessarily large force.

The joint part may include a radial part that extends radially outward from the press fitting part, and a circumferential part that extends in a circumferential direction from an end of the radial part opposite to the press fitting part. In this way, the joint part can be formed without extending it in the axial direction. Further, as compared with a case of providing the joint part extending in the axial direction of the motor shaft, a desired length of the circumferential part can be secured without requiring an excessive thickness of the holder. The direction in which the parts extend needs not to be perpendicular to the axial direction of the motor shaft. A slight inclination (e.g., 30° or less) may be provided.

The circumferential part may include: a first circumferential part extending in one circumferential direction from the radial part; and a second circumferential part extending in the other circumferential direction from the radial part. In this way, a plurality of holding parts can be provided for one joint part.

The joint part may include a first joint part and a second joint part at different positions in the circumferential direction, and the circumferential part of the first joint part and the circumferential part of the second joint part may be spaced apart from each other. In this way, one of the ends of the circumferential part becomes a free end so that each circumferential part can function as a cantilever spring.

The holding part may be provided near an end of the circumferential part. This can increase the amount of displacement of the holding part.

The joint part may include a first joint part and a second joint part at different positions in the circumferential direction, and the circumferential part of the first joint part and the circumferential part of the second joint part may be joined. This allows a part of the joint part to be deflected with a relatively simple structure.

The holding part may be provided in a region in which the circumferential part of the first joint part and the circumferential part of the second joint part are joined.

A total of 2n+1 (n is an integer equal to or more than 1) joint parts may be provided at equal intervals in the circumferential direction. In this way, the sensor magnet holder can hold the sensor magnet in a well-balanced manner.

The holding part may be provided opposite to the radial part, sandwiching the press fitting part. This prevents the plurality of radial parts from being aligned in a line in the sensor magnet holder.

Another embodiment of the present invention relates to a magnet fixing structure. The magnet fixing structure includes: an annular sensor magnet; and the sensor magnet holder mounted to the center of the sensor magnet. The sensor magnet holder is configured such that the press fitting part and the holding part overlap the sensor magnet when the sensor magnet holder mounted to the sensor magnet is viewed in a radial direction. This can realize a thin magnet fixing structure.

A motor may include: a rotor in which a shaft is fixed at the center; and the magnet fixing structure. The magnet fixing structure may be configured such that the shaft is press fitted to the press fitting part. This reduces transmission of a force generated when the motor shaft is inserted into the press fitting part to the holding part, preventing a crack in the sensor magnet due to an excessive biasing force.

Optional combinations of the aforementioned constituting elements, and implementations of the invention in the form of methods, apparatuses, and systems may also be practiced as additional modes of the present invention.

According to the embodiment, the size of the magnet holder can be reduced.

A description will be given of an embodiment of the present invention with reference to the drawings. Like numerals represent like elements so that the description will be omitted accordingly. The structure described below is by way of example only and does not limit the scope of the invention.

The technology of the present invention can be applied to all types of small motors like brushless motors and motors with a reducer in which it is required to detect a rotational speed and rotational position. The description below relates to a case where the technology is applied to motors with a worm reducer.

(Motor with Reducer)

FIG. 1 is a cross sectional view of a motor with a worm reducer according to the embodiment provided with a rotation detector. A motor 10 with a reducer includes a motor unit 12 and a reducer unit 14. The motor 10 with a reducer is an ordinary brushed DC motor. The motor unit 12 includes a motor case 16 formed by a metallic material into a shape of a bottomed cylinder and fitted with a magnet on the inner circumferential surface thereof, and an end bell 18 attached to the motor case 16 so as to close the opening of the motor case 16. The end of a motor shaft 20 extending outside from the end bell 18 of the motor unit 12 is pivotally supported by a bearing 24 provided inside a reducer case 22.

The reducer unit 14 is comprised of a worm 26 coupled to the extension of the motor shaft 20, a worm wheel (not shown) in mesh with the worm 26, an output shaft (not shown) leading from the center of the worm wheel, etc. The shaft is connected to, for example, a vehicle power window apparatus.

A rotation detector 28 is comprised of a combination of a sensor magnet 30 provided on the rotatable side and a magnetically sensitive device (e.g., a Hall device or a Giant Magneto Resistive (GMR) device (not shown)) provided on the fixed side. By way of example, the Hall element is mounted on a substrate fixed to the reducer case 22 or the end bell 18 so as to face the sensor magnet 30 in rotation. The rotation detector 28 is provided with a wiring to feed a current to the Hall device and extract a signal therefrom. The Hall device of the rotation detector 28 detects the magnetic flux that varies according to the relative movement of the sensor magnet 30 and the Hall device due to the rotation of the motor and outputs the variation as a pulse signal. This makes it possible to detect and control the rotational speed and rotational position of the motor.

(Sensor Magnet Holder)

Figure 2A:
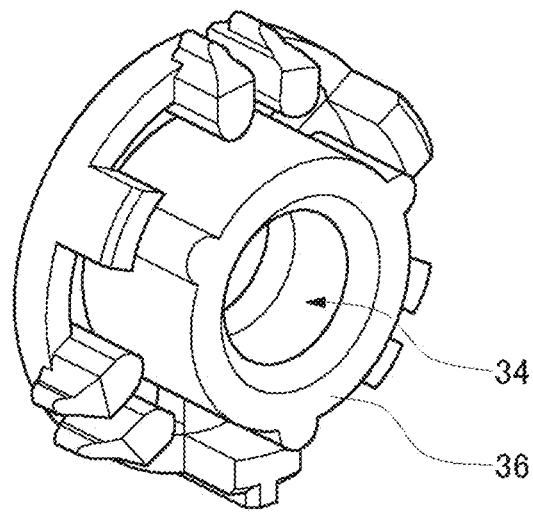
FIG. 2A is a perspective view of the sensor magnet holder according to the embodiment.
Figure 2B:
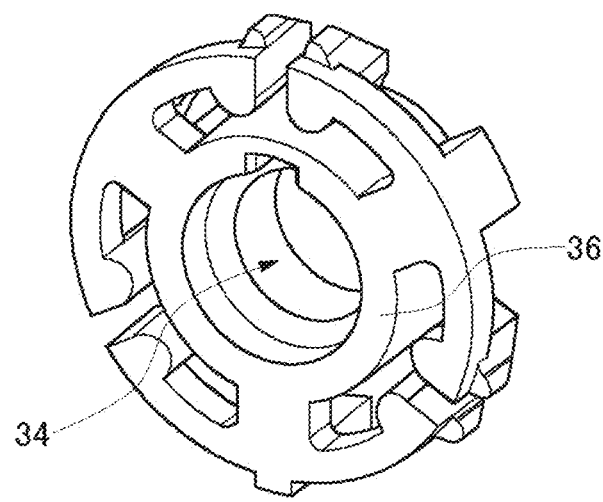
FIG. 2B is a perspective view of the sensor magnet holder according to the embodiment viewed in a direction different from that of FIG. 2A.
Figure 3:
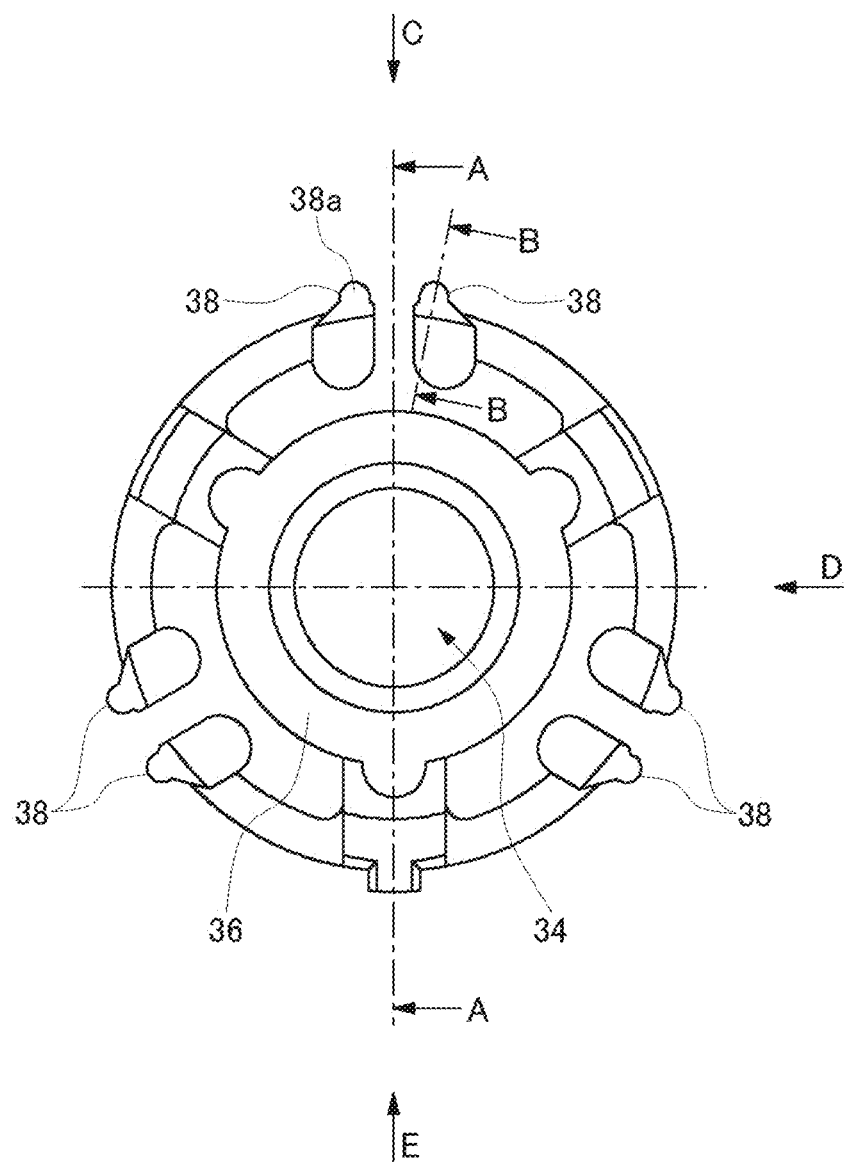
FIG. 3 is a front view of the sensor magnet holder according to the embodiment.
Figure 4:
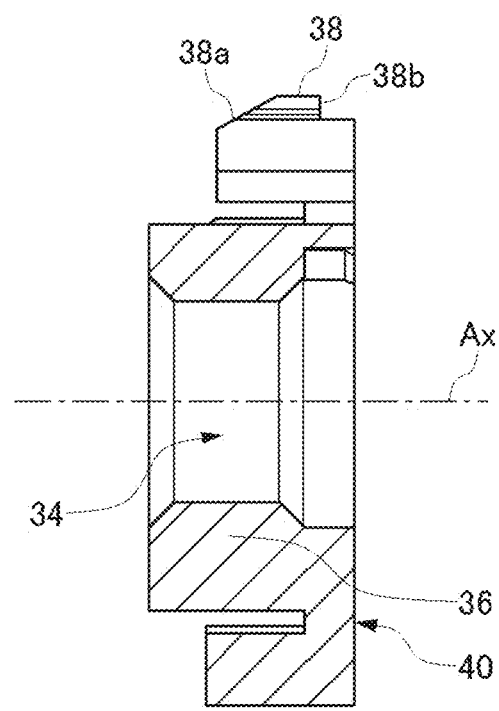
FIG. 4 is a sectional view along A-A of the sensor magnet holder shown in FIG. 3.
Figure 5:
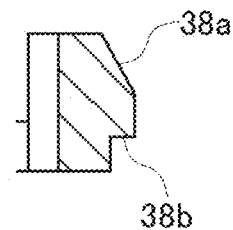
FIG. 5 is a sectional view along B-B of the sensor magnet holder shown in FIG. 3.
Figure 6:
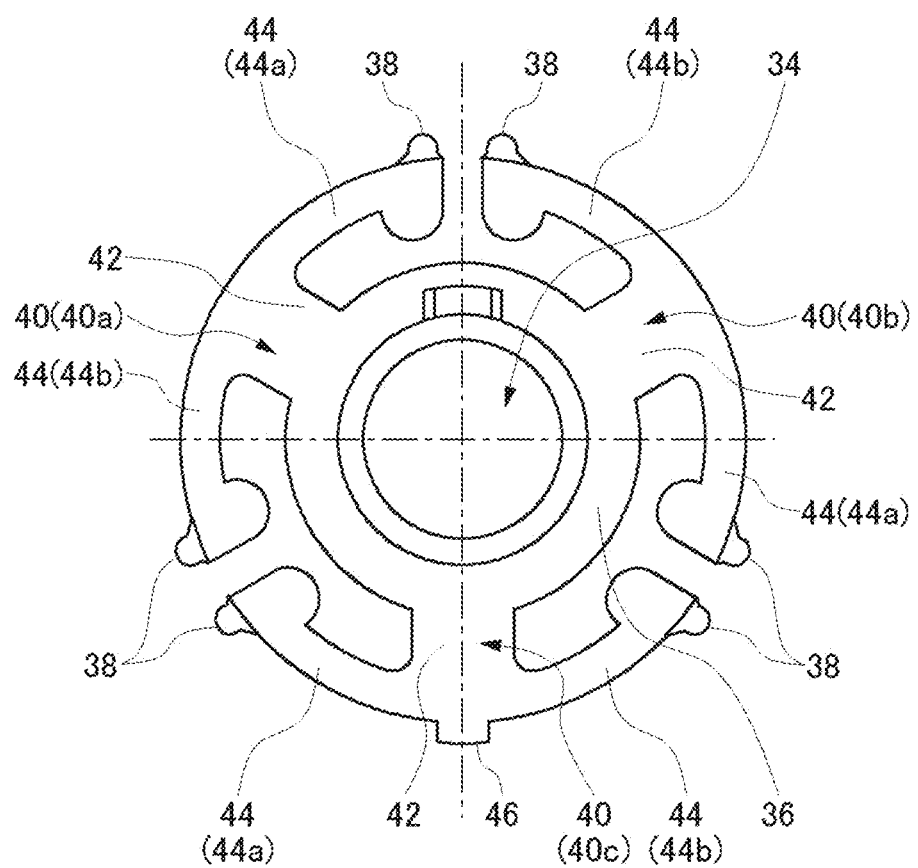
FIG. 6 is a rear view of the sensor magnet holder according to the embodiment.
Figure 7A:
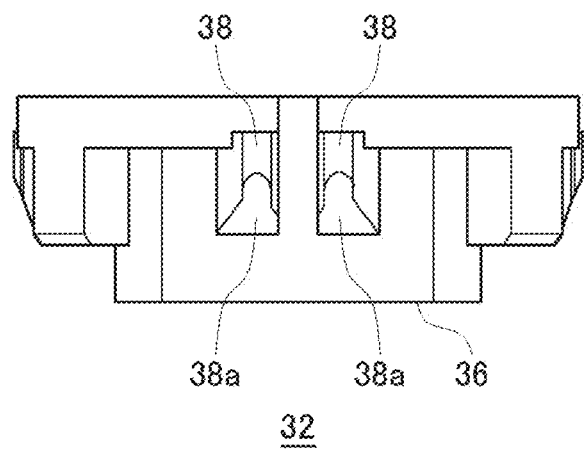
FIG. 7A is a side view of the sensor magnet holder shown in FIG. 3 viewed in direction C.
Figure 7B:
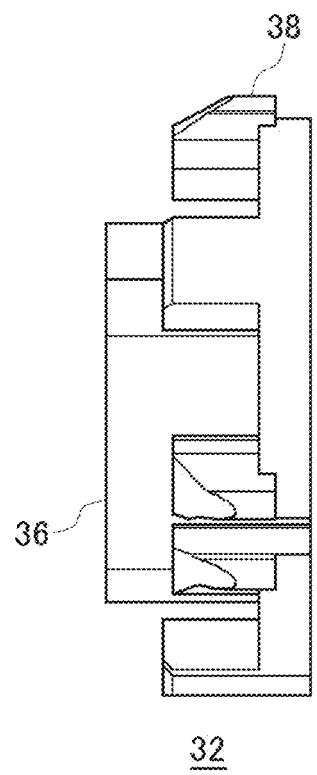
FIG. 7B is a side of the sensor magnet holder shown in FIG. 3 viewed in direction D.
Figure 7C:
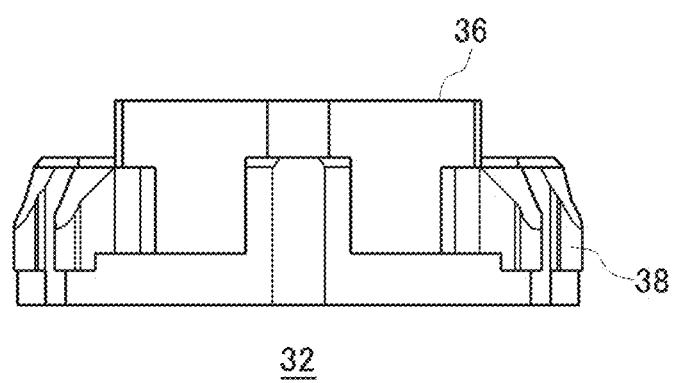
FIG. 7C is a side view of the sensor magnet holder shown in FIG. 3 viewed in direction E.

FIG. 2A is a perspective view of the sensor magnet holder according to the embodiment, and FIG. 2B is a perspective view of the sensor magnet holder according to the embodiment viewed in a direction different from that of FIG. 2A. FIG. 3 is a front view of the sensor magnet holder according to the embodiment. FIG. 4 is a sectional view along A-A of the sensor magnet holder shown in FIG. 3. FIG. 5 is a sectional view along B-B of the sensor magnet holder 32 shown in FIG. 3. FIG. 6 is a rear view of the sensor magnet holder according to the embodiment. FIG. 7A is a side view of the sensor magnet holder shown in FIG. 3 viewed in direction C, FIG. 7B is a side of the sensor magnet holder shown in FIG. 3 viewed in direction D, and FIG. 7C is a side view of the sensor magnet holder shown in FIG. 3 viewed in direction E.

The sensor magnet holder 32 (hereinafter, referred to as "holder 32" as appropriate) is an annular resin member used to fix the sensor magnet 30 to the motor shaft 20. The holder 32 includes a plurality of annular press fitting parts 36 formed with a through hole 34 in which the motor shaft 20 is press fitted, a holding part 38 provided radially outside the press fitting part 36 and configured to hold the sensor magnet 30, and a joint part 40 configured to join the press fitting part 36 and the holding part 38.

In the holder 32 according to the embodiment, three joint parts 40 are provided at equal intervals (at intervals of 120° in the circumferential direction). Each of the joint parts 40 is configured such that at least a part thereof is deflected by an external force. The through hole 34 has a circular shape that conforms to the sectional shape of the motor shaft 20.

The holder 32 configured as described above can be thinner than otherwise because the press fitting part 36 and the holding part 38 are not aligned in an axial direction Ax of the motor shaft 20. Further, the holding part 38 is capable of holding the sensor magnet 30 in a stable manner as a result of the joint part 40 being deflected. By selecting the shape and material of the joint part 40 as appropriate, the holding part 38 is prevented from biasing the sensor magnet 30 with an unnecessarily large force.

As shown in FIG. 6, the joint part 40 includes a radial part 42 that extends radially outward from the press fitting part 36, and a circumferential part 44 that extends in a circumferential direction from an end of the radial part 42 opposite to the press fitting part 36. The circumferential part 44 is an arc-shaped arm. In this way, the joint part 40 can be formed without extending it in the axial direction Ax. Further, as compared with a case of providing the joint part 40 extending in the axial direction Ax of the motor shaft 20, a desired length of the circumferential part 44 can be secured without requiring an excessive thickness of the holder 32. The direction in which the parts extend needs not to be perpendicular to the axial direction of the motor shaft. A slight inclination (e.g., 30° or less) may be provided.

The circumferential part 44 according to the embodiment includes a first circumferential part 44a extending in one circumferential direction from the radial part 42 and a second circumferential part 44b extending in the other circumferential direction from the radial part 42. In this way, a plurality of holding parts 38 can be provided for one joint part 40. By increasing the number of holding parts 38 for holding the sensor magnet 30, the holder 32 for holding the sensor magnet 30 is prevented from becoming loose or displaced.

Further, the joint part 40 includes a first joint part 40a, a second joint part 40b, and a third joint part 40c at different positions in the circumferential direction and at equal intervals. The first circumferential part 44a of the first joint part 40a and the second circumferential part 44b of the second joint part 40b are spaced apart from each other. Similarly, the first circumferential part 44a of the second joint part 40b and the second circumferential part 44b of the third joint part 40c are spaced part from each other. Further, the first circumferential part 44a of the third joint part 40c and the second circumferential part 44b of the first joint part 40a are spaced apart from each other. In this way, one of the ends of the circumferential part 44 becomes a free end so that each circumferential part can function as a cantilever spring.

The holding part 38 is provided near the end of the circumferential part 44. This can increase the amount of displacement of the holding part 38 due to the deflection of the circumferential part 44. Further, as shown in FIG. 5, the holding part 38 includes a guide face 38a that comes into contact with the inner circumferential surface of the ring-shaped sensor magnet 30 as the holder 32 is mounted to the sensor magnet 30. As shown in FIG. 4, the guide face 38a is formed at an angle with respect to the axial direction Ax. Further, the holding part 38 includes a locking part 38b (see FIG. 5) that prevents the holder 32 mounted to the sensor magnet 30 from being dislocated. The function of the locking part 38b will be described later.

As described above, three joint parts 40 are provided at equal intervals in the circumferential direction. In this way, the holder 32 can hold the sensor magnet 30 in a well-balanced manner. Further, the holding part 38 is provided opposite to the radial part 42, sandwiching the press fitting part 36. This prevents the plurality of radial parts 42 from being aligned in a line in the radial direction of the holder 32 (see FIG. 6). The same is true of a case where a total of 2n+1 (n is an integer equal to or more than 1) joint parts 40 are provided.

The holder 32 is formed with a convex part 46 as a rotation stopper that prevents the holder 32 from being rotated with respect to the sensor magnet 30 while the holder 32 is holding the sensor magnet 30. The convex part 46 is provided in the outer circumferential part of the holder 32 and is an extension of the radial part 42 of the joint part 40. The convex part 46 may be provided in each of the three joint parts 40.

(Sensor Magnet)

Figure 8A:
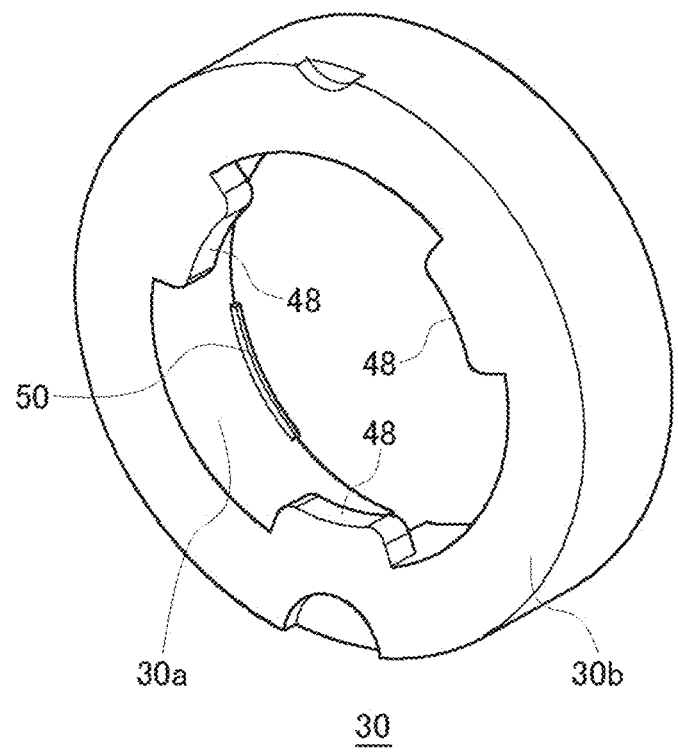
FIG. 8A is a perspective view of the sensor magnet according to the embodiment.
Figure 8B:
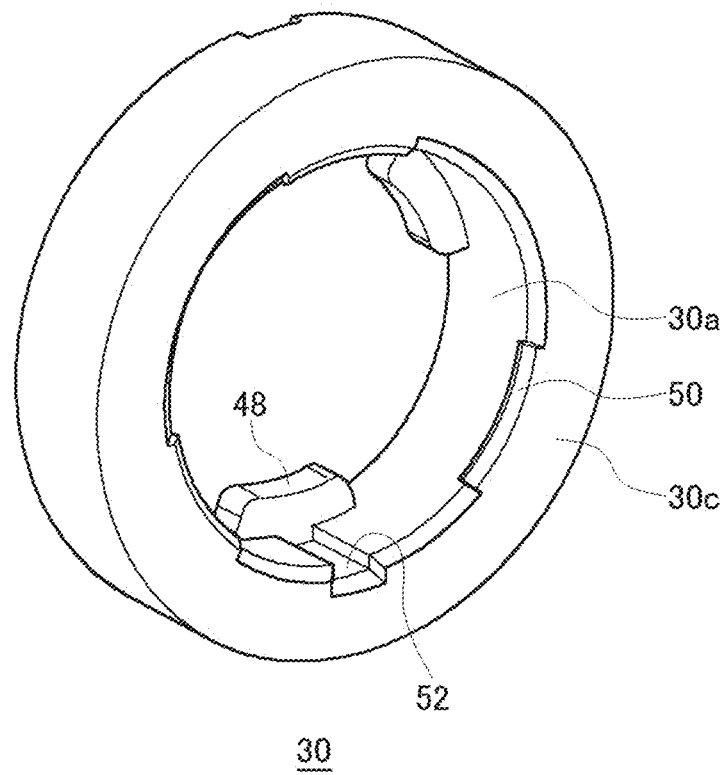
FIG. 8B is a perspective view of the sensor magnet according to the embodiment viewed in a direction different from that of FIG. 8A.
Figure 9:
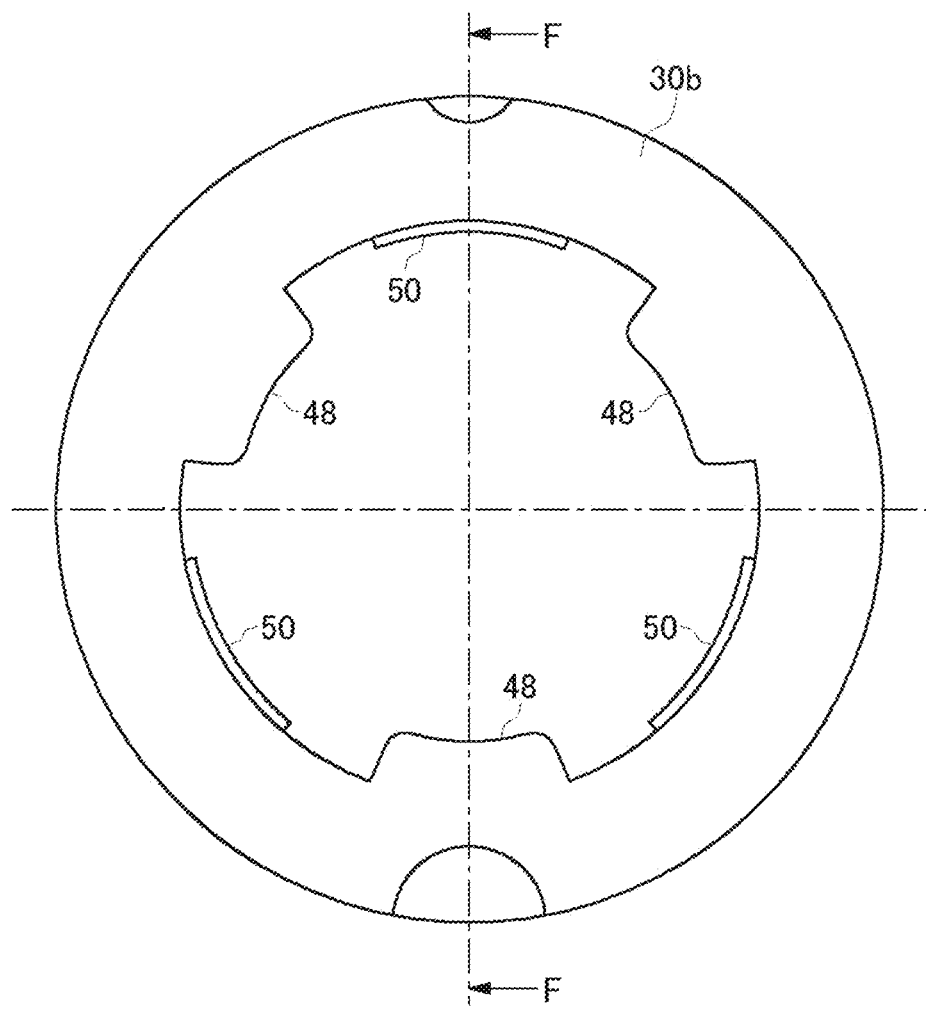
FIG. 9 is a front view of the sensor magnet according to the embodiment.
Figure 10:
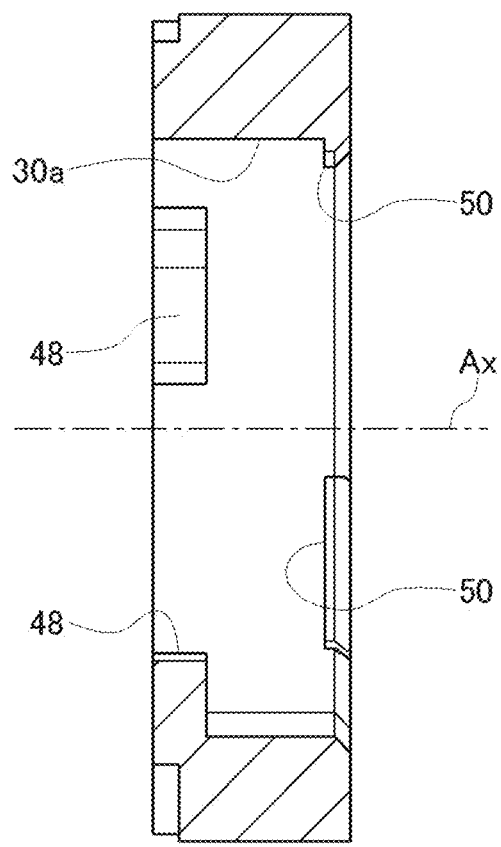
FIG. 10 is a sectional view along F-F of the sensor magnet holder shown in FIG. 9.
Figure 11:
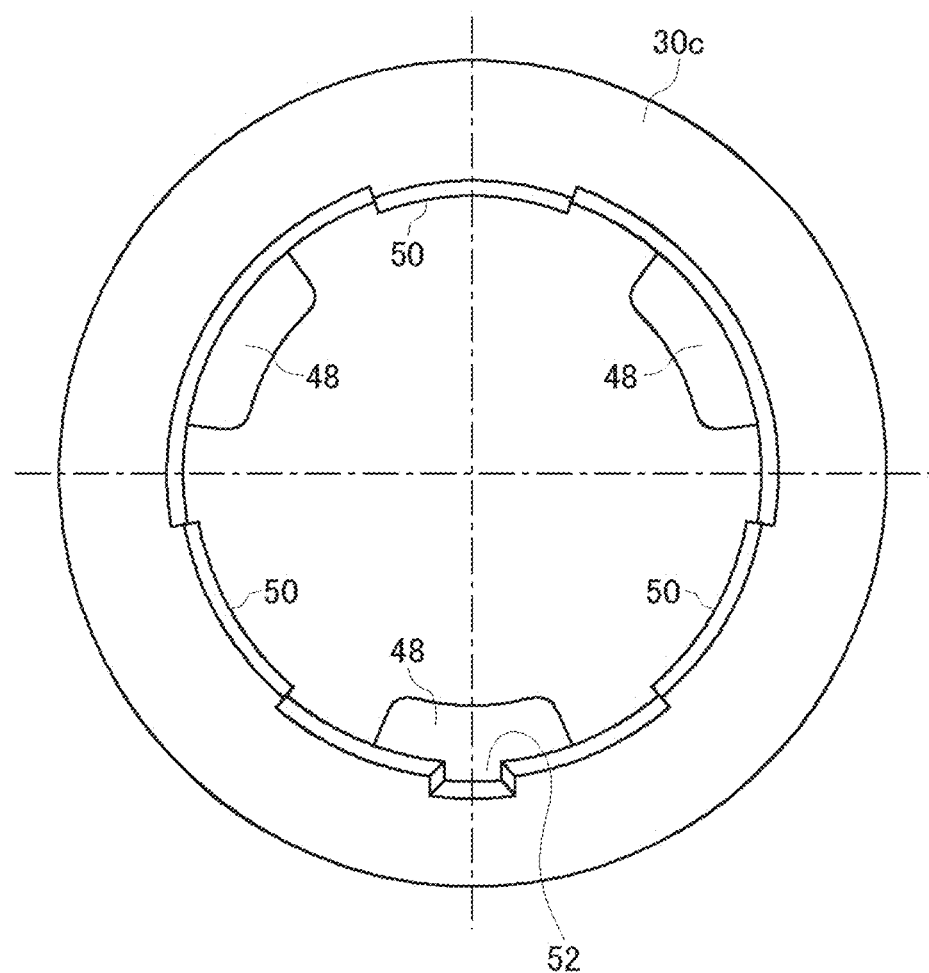
FIG. 11 is a rear view of the sensor magnet according to the embodiment.

FIG. 8A is a perspective view of the sensor magnet 30 according to the embodiment, and FIG. 8B is a perspective view of the sensor magnet 30 according to the embodiment viewed in a direction different from that of FIG. 8A. FIG. 9 is a front view of the sensor magnet 30 according to the embodiment. FIG. 10 is a sectional view along F-F of the sensor magnet holder shown in FIG. 9. FIG. 11 is a rear view of the sensor magnet 30 according to the embodiment.

The sensor magnet 30 is, for example, a ferrite resin magnet and formed as one piece in a desired shape. More specifically, the sensor magnet 30 is an annular component formed with a space for mounting the holder 32 at the center. N poles and S poles are alternately formed on the outer circumferential surface.

As shown in FIG. 8A, the sensor magnet 30 is formed with three abutting parts 48 at respective edges of an inner circumferential part 30a near one end face 30b. The abutting part 48 is an arc-shaped portion protruding from the inner circumferential part 30a toward the center. The relative axial position of the holder 32 and the sensor magnet 30 are defined as a result of a portion of the holder 32 coming into contact with the abutting part 48.

As shown in FIG. 8B, the sensor magnet 30 is also formed with three retaining parts 50 at respective edges of the inner circumferential part 30a near the other end face 30c. The retaining part 50 is an arc-shaped portion protruding from the inner circumferential part 30a toward the center. The holder 32 is prevented from being dislocated from the sensor magnet 30 as a result of the locking part 38b of the holding part 38 of the holder 32 as mounted being locked by the retaining part 50.

The three abutting parts 48 are formed at substantially equal intervals and are arranged at the intervals of 120° in the circumferential direction around the axial direction Ax. Also, the three retaining parts 50 are formed at substantially equal intervals and are arranged at the intervals of 120° in the circumferential direction around the axial direction Ax. Further, as shown in FIG. 11, the abutting part 48 and the retaining part 50 are arranged so as not to overlap each other in the axial direction Ax.

As shown in FIG. 8b, the sensor magnet 30 is formed with a concave groove 52 in the inner circumferential part 30a to prevent the holder 32 as mounted from being rotated with respect to the sensor magnet 30. The concave groove 52 is formed to extend from the other end face 30c of the sensor magnet 30 to the abutting part 48.

(Magnet Fixing Structure)

Figure 12A:
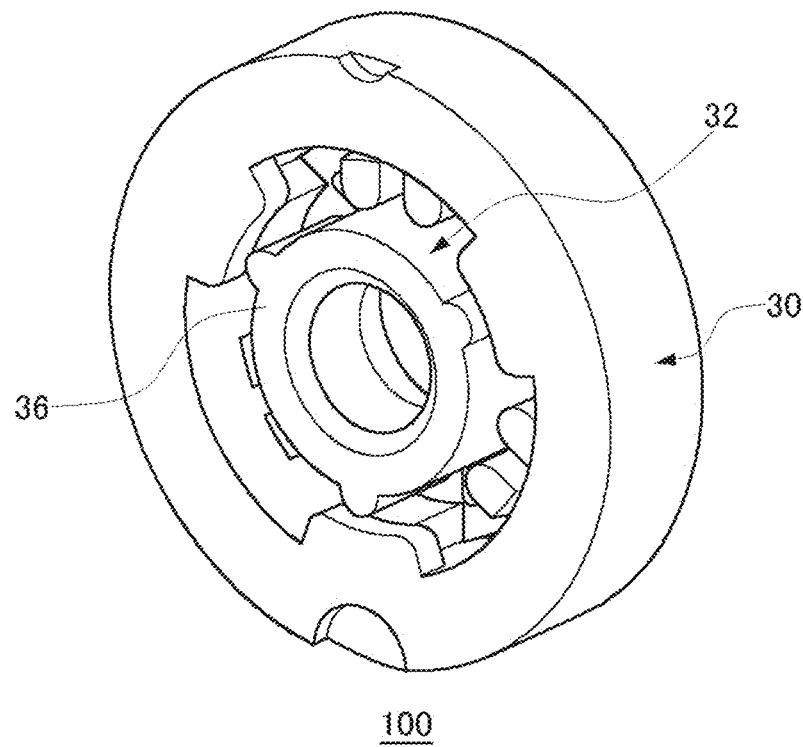
FIG. 12A is a perspective view of the magnet fixing structure according to the embodiment.
Figure 12B:
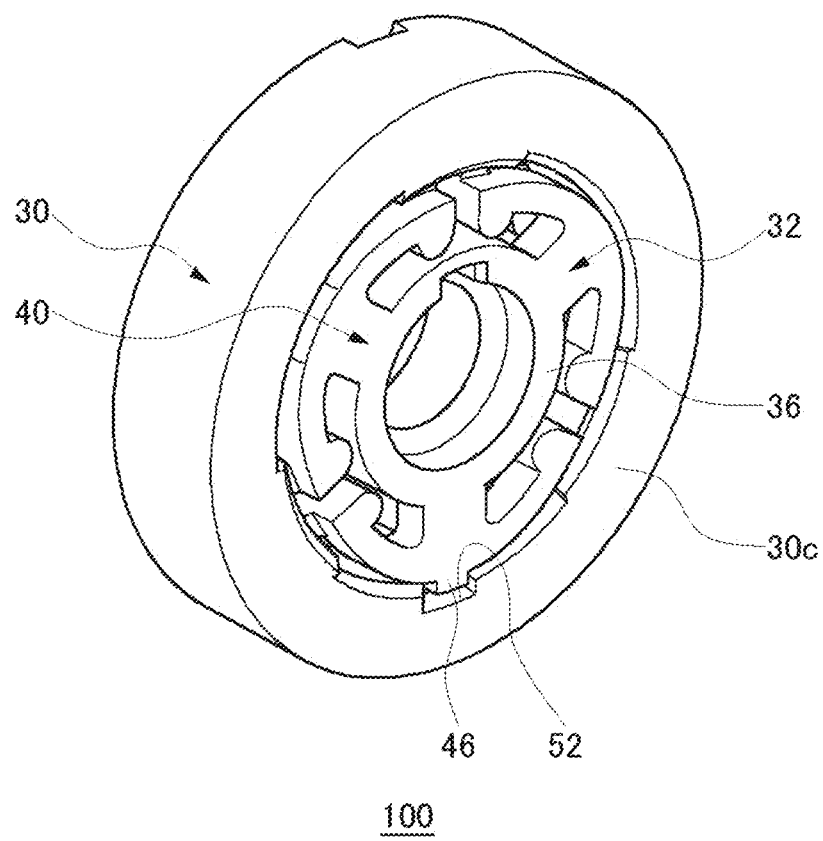
FIG. 12B is a perspective view of the magnet fixing structure according to the embodiment viewed in a direction different from that of FIG. 12A.
Figure 13:
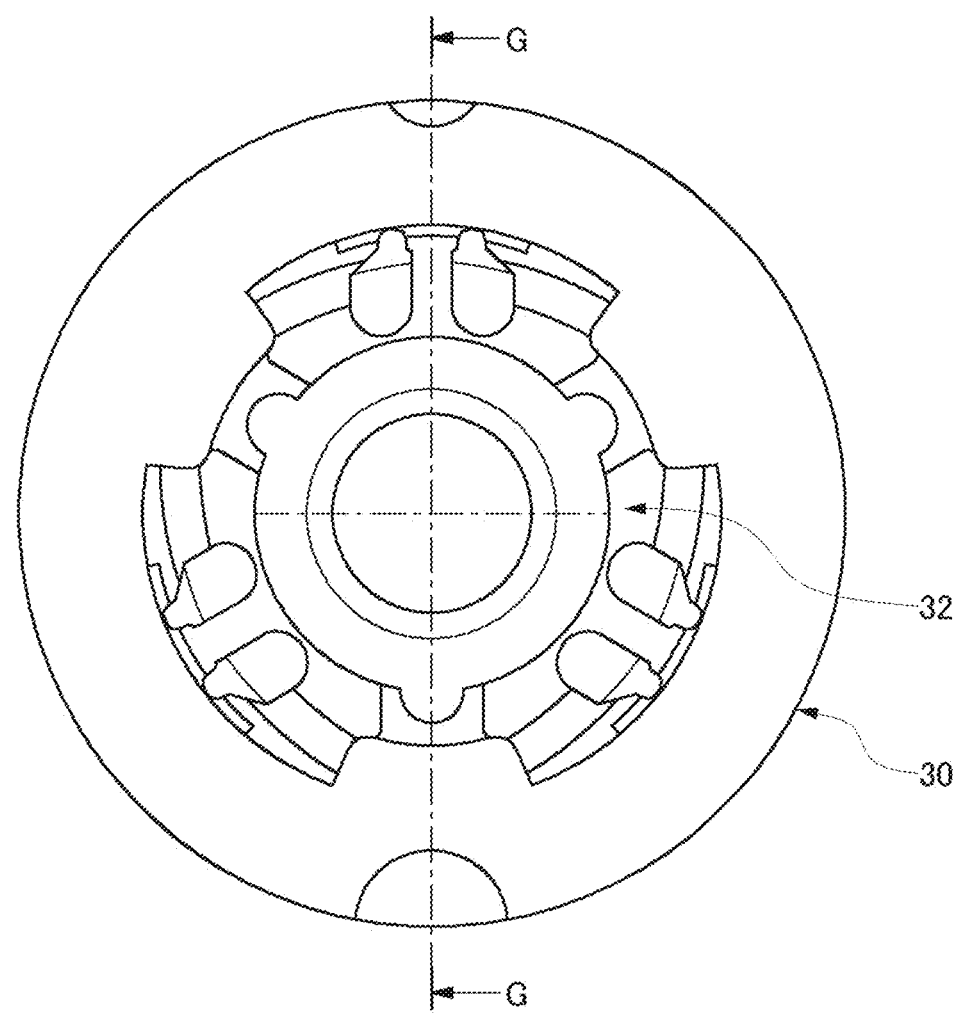
FIG. 13 is a front view of the magnet fixing structure according to the embodiment.
Figure 14:
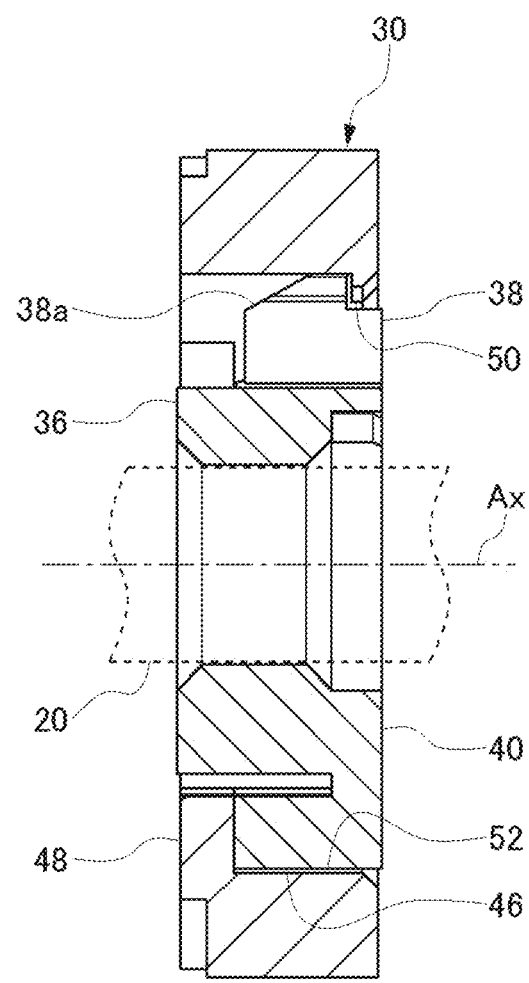
FIG. 14 is a sectional view along G-G of the magnet fixing structure shown in FIG. 13.

FIG. 12A is a perspective view of the magnet fixing structure according to the embodiment, and FIG. 12B is a perspective view of the magnet fixing structure according to the embodiment viewed in a direction different from that of FIG. 12A. FIG. 13 is a front view of the magnet fixing structure according to the embodiment. FIG. 14 is a sectional view along G-G of the magnet fixing structure shown in FIG. 13.

A magnet fixing structure 100 according to the embodiment includes the annular sensor magnet 30 and the holder 32 mounted to the center of the sensor magnet 30. The holder 32 is mounted from the side of the other end face 30c of the sensor magnet 30. In this process, the holder 32 is positioned and prevented from being rotated with respect to the sensor magnet 30, by inserting the holder 32 such that the position of the convex part 46 of the holder 32 is aligned with the concave groove 52.

As the holder 32 is mounted, the guide face 38a of the holding part 38 comes into contact with the retaining part 50, causing the circumferential part 44 to be deflected toward the center of the holder 32. Subsequently, as the guide face 38a of the holding part 38 gets over the retaining part 50 and the force with which the retaining part 50 biases the holding part 38 is reduced, the elastic force cancels the deflection of the circumferential part 44, allowing the holding part 38 to hold the entirety of the sensor magnet 30 by biasing the inner circumferential part 30a of the sensor magnet 30. Once the holder 32 is mounted, the locking part 38b has gone over the retaining part 50 so that the holder 32 is prevented from being dislodged from the sensor magnet 30.

The holder 32 according to the embodiment is configured such that the press fitting part 36 and the holding part 38 overlap the sensor magnet 30 when the holder 32 mounted to the sensor magnet 30 is viewed in a radial direction (see FIG. 14). This can realize a thin magnet fixing structure 100. The holder 32 is also configured so that the press fitting part 36 and the holding part 38 overlap each other when the holder 32 is viewed in a radial direction. This can realize a thin holder 32. It is more preferred that the holder 32 be configured such that the press fitting part 36, the joint part 40, and the holding part 38 overlap in part or entirely when the holder 32 is viewed in a radial direction.

The motor 10 with a reducer according to the embodiment includes a rotor in which the motor shaft 20 is fixed at the center and the magnet fixing structure 100. The magnet fixing structure 100 is configured such that the motor shaft 20 is press fitted to the press fitting part 36 (see FIG. 14). This reduces transmission of a force generated when the motor shaft 20 is inserted into the press fitting part 36 to the holding part 38, preventing a crack in the sensor magnet 30 due to an excessive biasing force.

(Variation)

Figure 15:
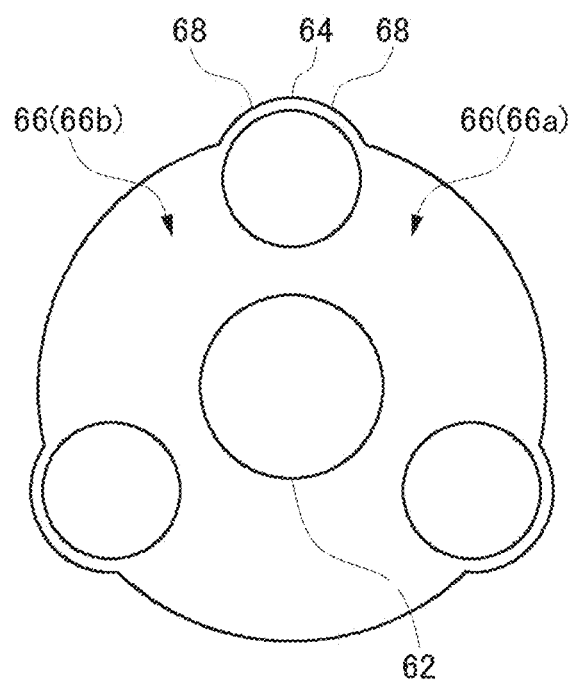
FIG. 15 is a front view of the sensor magnet holder according to the first variation.
Figure 16:
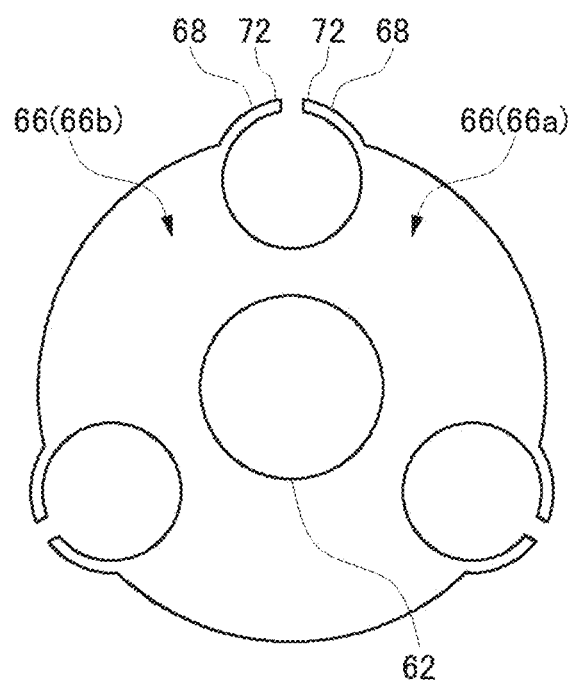
FIG. 16 is a front view of the sensor magnet holder according to the second variation.

A description will be given of variations of the sensor magnet holder. The description focuses on characteristic features and a description of features similar to those of the above embodiment will be omitted as appropriate. FIG. 15 is a front view of the sensor magnet holder according to the first variation. FIG. 16 is a front view of the sensor magnet holder according to the second variation.

A holder 60 includes a press fitting part 62 in which the motor shaft 20 is inserted, a holding part 64 provided radially outside the press fitting part 62 and configured to hold the sensor magnet 30, and a joint part 66 configured to join the press fitting part 62 and the holding part 64. The joint part 66 is configured such that at least a part thereof is deflected by an external force.

The joint part 66 of the holder 60 includes a first joint part 66a and a second joint part 66b at different positions in the circumferential direction. A circumferential part 68 of the first joint part 66a and the circumferential part 68 of the second joint part 66b are joined. This allows a part of the joint part 66 to be deflected with a relatively simple structure. Further, the holding part 64 is provided in a region in which the circumferential part 68 of the first joint part 66a and the circumferential part 68 of the second joint part 66b are joined. As in the case of a sensor magnet holder 70 shown in FIG. 16, the circumferential parts 68 of the respective joint parts 66 may be spaced apart from each other. In this case, a holding part 72 may be provided at the end of each circumferential part 68.

Figure 17:
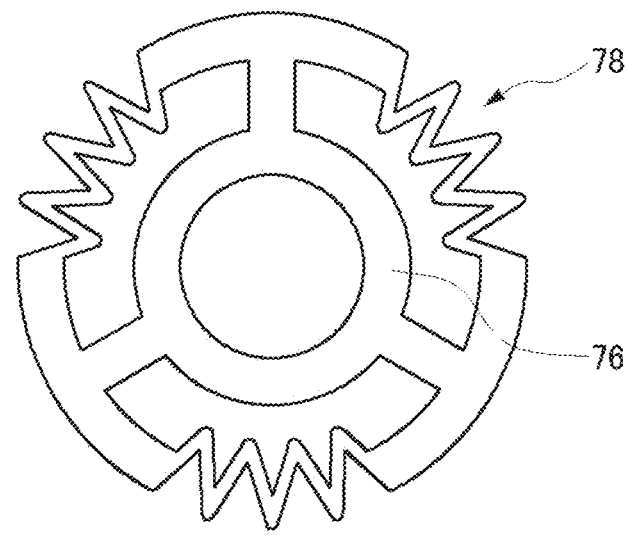
FIG. 17 is a front view of the sensor magnet holder according to the third variation.

FIG. 17 is a front view of the sensor magnet holder according to the third variation. A holder 74 is of a double annular structure including an outer annular part and an inner annular part. The inner annular part corresponds to the press fitting part 76 and a holding part 78 is formed in a part of the outer annular part. The holding part 78 is a formed as bellows and holds the sensor magnet 30 with a desired biasing force by selecting the thickness and the number of folds as appropriate.

Figure 18:
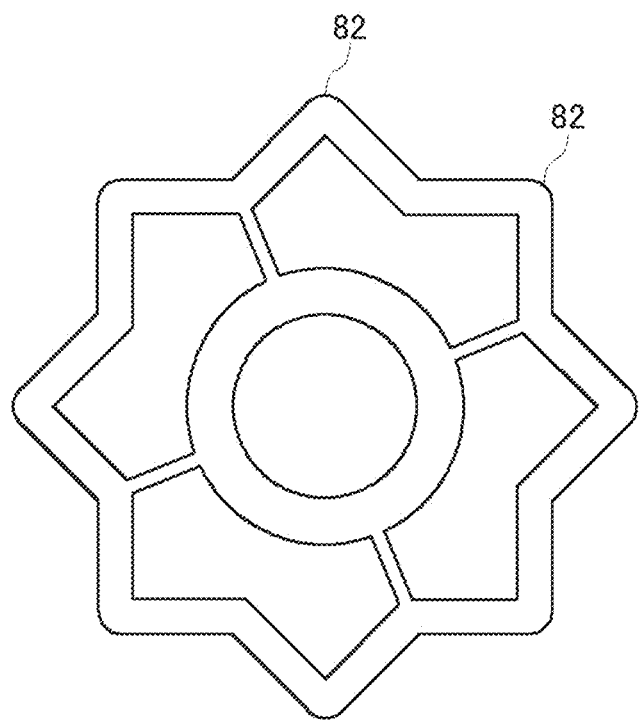
FIG. 18 is a front view of the sensor magnet holder according to the fourth variation.

FIG. 18 is a front view of the sensor magnet holder according to the fourth variation. The outer circumferential part of a holder 80 is polygonal (octagon) in shape instead of annular. The holding part 82 is at the apex of the polygon.

Figure 19:
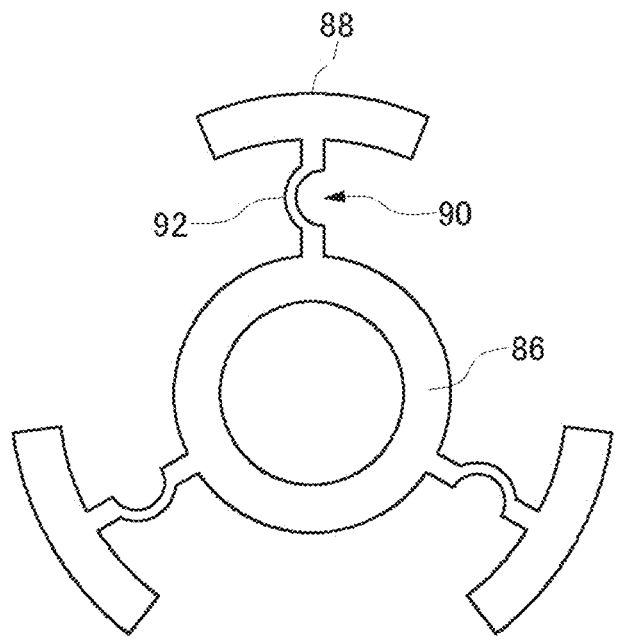
FIG. 19 is a front view of the sensor magnet holder according to the fifth variation.

FIG. 19 is a front view of the sensor magnet holder according to the fifth variation. The holder 84 includes a joint part 90 that joins a press fitting part 86 and a holding part 88. The joint part 90 is configured such that a radial part 92 thereof is deflectable.

Figure 20:
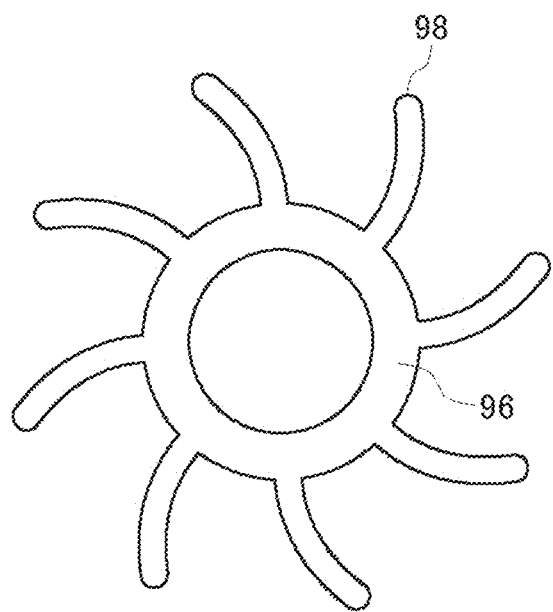
FIG. 20 is a front view of the sensor magnet holder according to the sixth variation.

FIG. 20 is a front view of the sensor magnet holder according to the sixth variation. A plurality of arms 98 that spiral outward from a press fitting part 96 are formed in a holder 94. The end of the arm 98 is the holding part. The arm 98 is curved and so is deflected with a relatively small force. Therefore, the holder 94 can hold the sensor magnet 30, biasing it with a light force.

Figure 21:
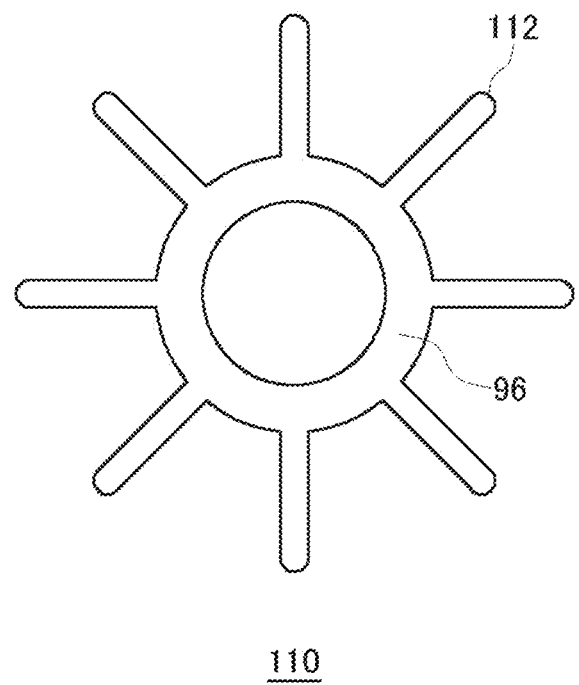
FIG. 21 is a front view of the sensor magnet holder according to the seventh variation.

FIG. 21 is a front view of the sensor magnet holder according to the seventh variation. A plurality of arms 112 are formed to extend radially outward from a press fitting part 96 in a holder 110. The arm 112 is of a linear shape so that a relatively large force is required to deflect the arm 112. In other words, the holder 110 can hold the sensor magnet 30 properly.

Figure 22:
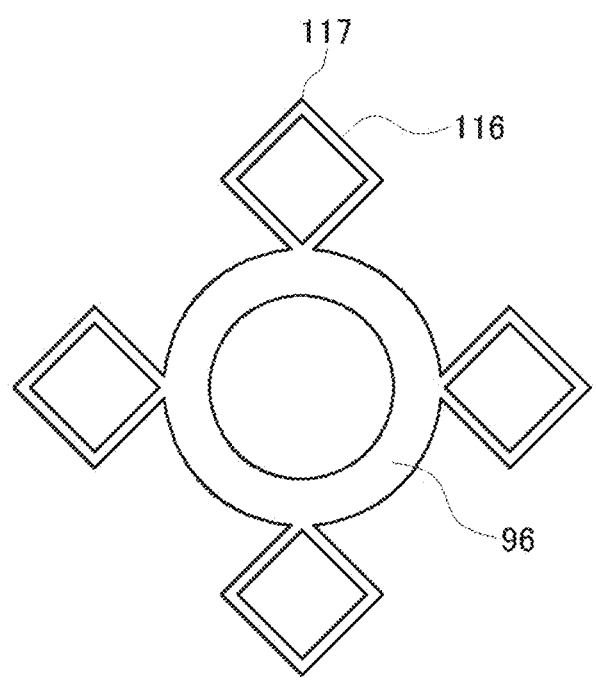
FIG. 22 is a front view of the sensor magnet holder according to the eighth variation.
Figure 23:
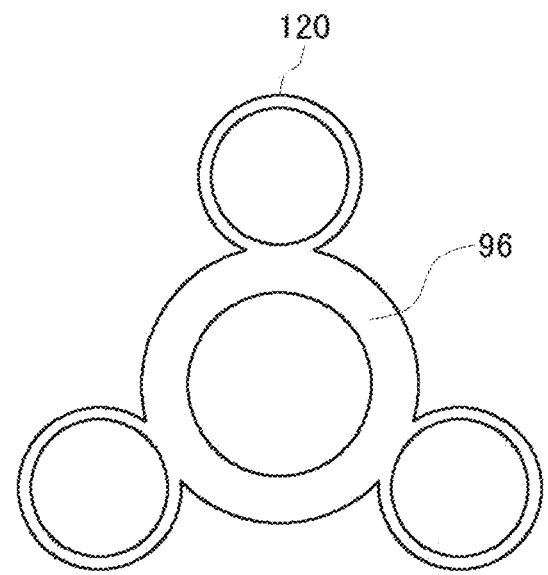
FIG. 23 is a front view of the sensor magnet holder according to the ninth variation.

FIG. 22 is a front view of the sensor magnet holder according to the eighth variation. Four joint parts 116 of deformable shape are provided in the outer circumferential part of the press fitting part 96 in a holder 114. The joint parts 116 are formed as rectangular frames and are deflected when the frame as a whole is deformed. Further, one apex of the joint part 116 functions as a holding part 117. FIG. 23 is a front view of the sensor magnet holder according to the ninth variation. Three holding parts 120 formed as circular frames are provided in a holder 118.

Figure 24:
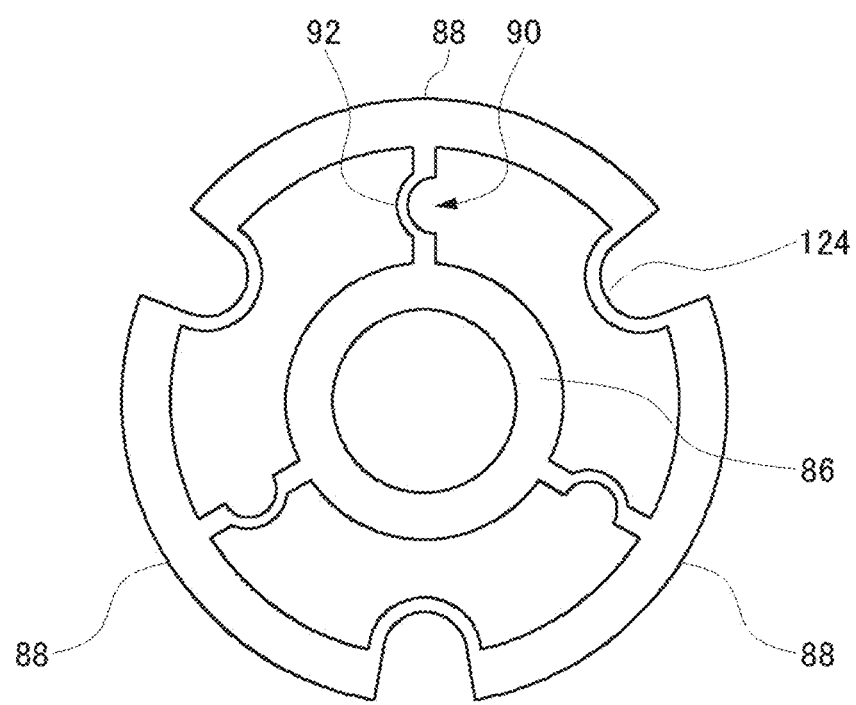
FIG. 24 is a front view of the sensor magnet holder according to the tenth variation.

FIG. 24 is a front view of the sensor magnet holder according to the tenth variation. A holder 122 is configured by annularly joining the plurality of holding parts 88 of the holder 84 shown in FIG. 19. A circumferential part 124 between adjacent holding parts 88 is configured to be deflectable.

The press fitting part, joint part, and holding part of the holders described above are formed as one piece. Alternatively, a plurality of members may be combined to form the holder. The holder is formed of, for example, glass-filled nylon. Alternatively, the holder may be formed of resin, rubber, elastomer, etc. The through hole 34 of the holder 32 needs not to be circular in shape but may be polygonal (non-circular) in shape. For example, the through hole 34 may be square or hexagonal in shape.

Given above is a description of the invention with reference to the embodiment and variations. The embodiment and variations of the present invention are not limited to those described above and appropriate combinations or replacements of the features of the embodiment and variations are also encompassed by the present invention. The embodiment and variations may be modified by way of combinations, rearranging of the processing sequence, design changes, etc., based on the knowledge of a skilled person, and such modifications are also within the scope of the present invention.

The invention claimed is:

1. A sensor magnet holder used to fix a sensor magnet to a motor shaft, comprising:
    a press fitting part to which the motor shaft is press fitted;
    a holding part provided radially outside the press fitting part to hold the sensor magnet; and
    a joint part that joins the press fitting part and the holding part, comprising:
        a radial part that extends radially outward from the press fitting part; and
        a circumferential part that extends in a circumferential direction from an end of the radial part opposite to the press fitting part,
    wherein the joint part is configured such that at least a part of the joint part is deflected by an external force.

2. The sensor magnet holder according to claim 1, wherein the circumferential part comprises:
    a first circumferential part extending in one circumferential direction from the radial part; and
    a second circumferential part extending in the other circumferential direction from the radial part.

3. The sensor magnet holder according to claim 1, wherein the joint part comprises a first joint part and a second joint part at different positions in the circumferential direction, and the circumferential part of the first joint part and the circumferential part of the second joint part are spaced apart from each other.

4. The sensor magnet holder according to claim 1, wherein the holding part is provided near an end of the circumferential part.

5. The sensor magnet holder according to claim 1, wherein the joint part comprises a first joint part and a second joint part at different positions in the circumferential direction, and the circumferential part of the first joint part and the circumferential part of the second joint part are joined.

6. The sensor magnet holder according to claim 5, wherein the holding part is provided in a region in which the circumferential part of the first joint part and the circumferential part of the second joint part are joined.

7. The sensor magnet holder according to claim 1, wherein a total of 2n+1 (n is an integer equal to or more than 1) joint parts are provided at equal intervals in the circumferential direction.

8. The sensor magnet holder according to claim 7, wherein the holding part is provided opposite to the radial part, sandwiching the press fitting part.

9. A magnet fixing structure comprising:
    an annular sensor magnet; and
    the sensor magnet holder according to claim 1 mounted to the center of the sensor magnet, wherein
    the sensor magnet holder is configured such that the press fitting part and the holding part are at least partially contained within the sensor magnet when the sensor magnet holder mounted to the sensor magnet is viewed in a direction perpendicular to an axis that runs through a center of the sensor magnet holder.

10. A motor comprising:
    a rotor in which a shaft is fixed at the center; and
    the magnet fixing structure according to claim 9, wherein the magnet fixing structure is configured such that the shaft is press fitted to the press fitting part.

\* \* \* \* \*